(12) United States Patent
Karbe et al.

(10) Patent No.: US 6,346,981 B1
(45) Date of Patent: Feb. 12, 2002

(54) LENS TESTING DEVICE

(75) Inventors: Peter Karbe, Leun; Rolf Crema; Joachim Kühn, both of Ehringshausen; Bernd Harand, Solms, all of (DE)

(73) Assignee: Leica Camera A.G., Solms (DE)

( * ) Notice: Subject to any disclaimer, the term of this patent is extended or adjusted under 35 U.S.C. 154(b) by 0 days.

(21) Appl. No.: 09/424,339

(22) PCT Filed: Mar. 15, 1999

(86) PCT No.: PCT/DE99/00706

§ 371 Date: Nov. 22, 1999

§ 102(e) Date: Nov. 22, 1999

(87) PCT Pub. No.: WO99/50636

PCT Pub. Date: Oct. 7, 1999

(30) Foreign Application Priority Data

Mar. 27, 1998 (DE) .......................................... 198 13 577
May 28, 1998 (DE) .......................................... 198 23 844

(51) Int. Cl.[7] .............................. G01B 9/00; G02B 21/26
(52) U.S. Cl. ........................ 356/124; 356/125; 356/126; 359/394
(58) Field of Search ................................ 356/124, 125, 356/126; 359/368, 379, 382, 394

(56) References Cited

U.S. PATENT DOCUMENTS

| 3,572,939 A | 3/1971 | Burdick ....................... 356/124 |
| 5,221,834 A | 6/1993 | Lisson et al. ............. 250/201.9 |
| 5,917,586 A * | 6/1999 | Ikezawa ...................... 356/124 |

FOREIGN PATENT DOCUMENTS

DE  38 42 144  6/1990

OTHER PUBLICATIONS

Schaefer, "Die Guetekennzeichnung Photographischer Objektive", pp. 3–12, (1970).
Haferkorn, "Lexikon der Optik", p. 184, (1991).
Patent Abstracts of Japan, Toshiaki, "Lens Inspection Device", (Jun. 20, 1997), JP 09–159575.
Patent Abstracts of Japan, Takeshi, "MTF Measuring Apparatus of Afocal Optical System", (Oct. 31, 1997), JP 09–281002.
Patent Abstracts of Japan, Hiroshi, "Measuring Device of Lens System and MTF Measuring Method of Lens System", vol. 098, No. 008, (Jun. 30, 1998), JP 10–068674 (Mar. 10, 1998).
Malacara, Optical Shop Testing, pp. 396–426, (1992).

* cited by examiner

*Primary Examiner*—Frank G. Font
*Assistant Examiner*—Amanda Merlino
(74) *Attorney, Agent, or Firm*—Foley & Lardner

(57) ABSTRACT

A lens testing device comprises a holder, fitted on a stand, for mounting a lens specimen, a test object illuminated from the rear, an imaging objective and a detector for evaluating the image of the test object. The imaging objective can be combined with the detector to form a unit. The lens specimen is an objective specimen and the test object is arranged in the focal plane of the objective specimen inside the holder. The imaging objective is a collimator objective and the detector is arranged in the focal plane of the collimator objective. Either the holder or the unit is pivotably supported on the stand and the holder and the unit can be pivoted relative to one another.

6 Claims, 2 Drawing Sheets

LENS TESTING DEVICE

BACKGROUND OF THE INVENTION

Field of the Invention

The invention relates to a lens testing device. Such a testing device is disclosed in the printed publication Patents Abstracts of Japan JP-A-09159575.

Measurement of the modulation-transformation function (MTF) is the quantitative method most frequently used to assess the optical imaging quality of photographic objectives and optical systems of related type. An objective testing device suitable for this purpose is known, for example, from Optical Shop Testing, edited by Daniel Malacara, published by John Wiley & Sons Inc., Second Edition, (1992), page 421. A slit illuminated from the rear or a hole (point) is projected to infinity using a collimator objective. The objective specimen images the slit or the hole in its focal plane. As a rule, the collimator focal length is greater than that of the specimen, with the result that there is a demagnifying imaging which can only be evaluated after remagnifying with the aid of a microscope objective.

The same operating principle is used by focal length measuring instruments in which the slit is replaced, for example, by a double slit. The focal length of the specimen can be determined by measuring the magnification of the double-slit image.

In order to measure the imaging properties (MTF) or the focal length (distortion) in the image field (image height≠0), the specimen must be pivoted, in accordance with the angular field, and the remagnifying microscope objective must be tracked relative to the image point.

An objective testing device suitable for this purpose is described in DE 38 42 144 A1. A test pattern illuminated from the rear is imaged to infinity via the exit lens of an illuminating device. The illuminating device can be pivoted relative to the specimen. The specimen is supported rotatably about its optical axis. The image of the test pattern produced by the specimen is imaged via a microscope objective onto a flat CCD array and evaluated via an image processing system. The image-recording device is arranged displaceably perpendicular to the optical axis of the specimen.

A testing device for an afocal optical system is disclosed in Patent Abstracts of Japan JP-A-09281002. An afocal objective is provided as specimen. The illuminating device and the detector device can be pivoted relative to the specimen.

The above mentioned Patent Abstracts of Japan JP-A-09159575 discloses a lens testing device in which the specimen images the test object illuminated from the rear directly into an intermediate image plane from which it is imaged via an imaging objective onto a detector device. This specimen is supported rotatably about its optical axis. The imaging objective and the detector device are combined to form a unit and fastened on a stand. The illuminating device with the test object, and the holder for the specimen are respectively combined to form further units which are likewise fastened on the stand with a fixed alignment relative to one another.

An object testing device is disclosed in Leitz-Mitteilungen für Wissenschaft und Technik, (1970), volume V, issue 1, pages 3–12, FIG. 5.

U.S. Pat. No. 5,221,834 discloses a control device for an imaging system, for example, a lens in which the local optical transfer function is determined.

The two-stage imaging present in the known devices necessitates a high technical outlay which, in the case of MTF applications, is reflected in the three-dimensional space requirement, in particular. The measuring accuracy depends very strongly on the imaging quality of the microscope objective. For measurements in the image field, the requirements placed on this relay optical system are particularly high, since the aperture is used only partially because of the measurement principle.

SUMMARY OF THE INVENTION

Object of the invention was to develop a lens testing device of universal applicability for different tests made on photographic and video objectives, which has a compact design and whose measuring accuracy is improved.

According to the invention, in the case of a lens testing device of the type mentioned at the beginning, this object is achieved by virtue of the fact that the lens specimen is an objective specimen, the test object is arranged in the focal plane of the objective specimen inside the holder, the imaging objective is a collimator objective, the detector device being arranged in the focal plane of the collimator objective, that either the holder or the unit is pivotably supported on the stand, and the holder and the unit can be pivoted relative to one another. The result of this is a single-stage, magnifying imaging of the test object. The image can be evaluated via an observing device. For measurements in the image field, either the holder can be pivoted with the specimen, or the unit can be pivoted with the observing device. It is advantageous when the test object is adjustably arranged inside the holder relative to the plane of the mount of the objective specimen.

For further measurements in the image field, the mount of the objective specimen is rotatably supported in the holder. It is possible to provide as an observing device a CCD camera whose recorded image can be fed to a monitor for visual assessment. For the purpose of automatic assessment of measurements it is possible to connect downstream an electronic image evaluating device which carries out the evaluation of measurements with the aid of image analysis methods.

BRIEF DESCRIPTION OF THE DRAWINGS

The design according to the invention of the lens testing device is represented schematically in the drawing, in which.

DETAILED DESCRIPTION OF THE EXEMPLARY EMBODIMENT

Figure 1:
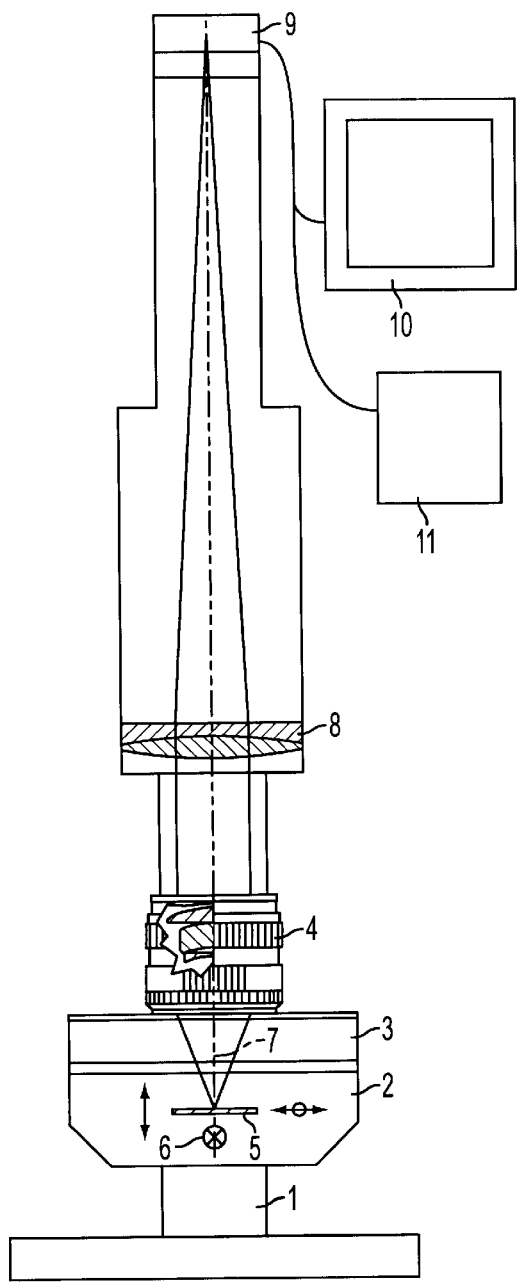
FIG. 1 shows the arrangement for measuring on the axis of the specimen.

FIG. 1 shows on a stand 1 a holder 2 with a mount 3 for an objective specimen 4. A test object 5 is arranged inside the holder 2 on a carriage (not represented). The test object comprises, for example, a plane-parallel glass plate on which various test structures, such as line or hole patterns, are supported. These structures are illuminated via a light source 6 with transmitted light, and projected to infinity through the specimen 4. The test object can be adjusted along the optical axis 7 of the specimen 4, in order to be able to focus it onto the focal plane of the specimen 4. This focusing can be performed automatically by a motor drive as a function of autofocus signals.

The test object is preferably arranged exchangeably on the carriage. However, it is also possible for a plurality of test fields with different structures to be supported on the test object. In this case, the test object can additionally also be displaceably supported with the carriage perpendicular to the optical axis 7. The directions of adjustment are indicated by arrows. The mechanical structure of such carriages is assumed to be known and is not the subject matter of the invention. The carriage can be adjusted manually or by motor in accordance with a prescribed test program.

The image, recorded by the specimen 4, of the test object 5 is projected onto a CCD camera 9 through a collimator objective 8 whose focal length should be greater than that of the specimen 4. The collimator objective 8 and the CCD camera 9 are expediently arranged in a housing 12 as a unit, in order to keep interfering ambient light away from the camera. Since magnifying imaging is concerned here, the imaged structures can be evaluated without additional remagnification. A first evaluation can consist in determining the plane with maximum image contrast as a function of the adjustment of the test object along the optical axis for a given local frequency. Autofocus signals for focusing the test object by motor in the focal plane of the specimen 4 can be derived from the measured contrast characteristic. As a rule, the format of the CCD camera 9 is smaller than or equal to the photograph format of the specimen 4, with the result that it is always only a section of the full image format of the specimen 4 which is covered as a function of the magnification.

Figure 2:
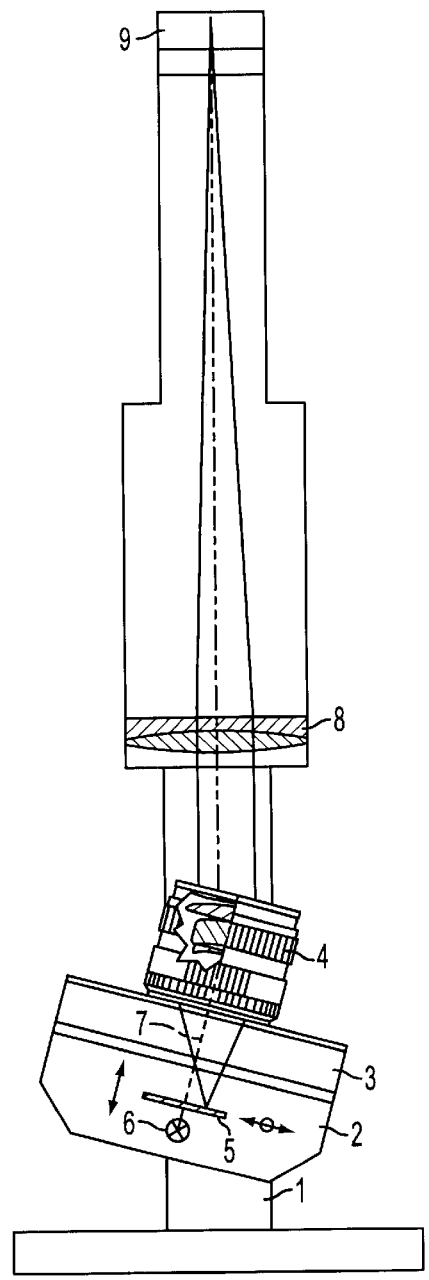
FIG. 2 shows the arrangement for measuring in the image field of the specimen with a pivoted holder.
Figure 3:
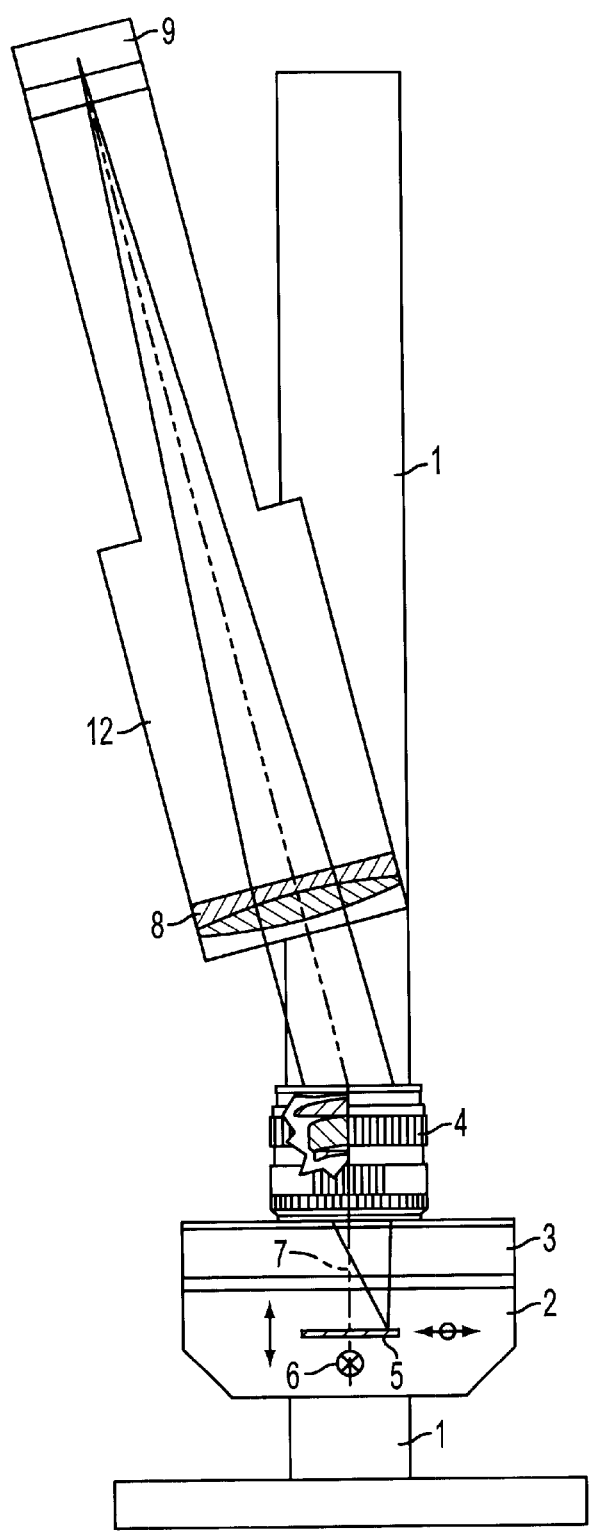
FIG. 3 shows the arrangement for measuring in the image field of the specimen with pivoted observing unit.

In order to be able to assess the specimen 4 in the image field, it is pivoted together with the test object 5 and the light source 6 with the holder about its entrance pupil in accordance with the angular field to be assessed. The angle of tilt can be measured and displayed. The pivoted state is represented in FIG. 2. Alternatively, the housing 12 can also be pivoted with the collimator objective 8 and the CCD camera 9, as represented in FIG. 3. In order to assess the entire image circle, the specimen 4 need then only be rotated about its optical axis 7. For this purpose, the mount 3 is designed as a rotating stage on the holder 2. The specimen remains fixed in its mount 3 during measurement.

The structures recorded by the CCD camera 9 are converted into image signals and can, if desired, be represented on a monitor 10 for visual evaluation. However, they can also be fed to an electronic image evaluation unit 11 for evaluation by image analysis. Suitable software for this is available, for example, from OEG GmbH, Frankfurt (Oder) under the name COMEF-MTF. The collimator objective 8 is optimally corrected for the spectral region to be investigated and for the imaging of objects at infinity. The image errors produced in the image plane of the CCD camera are therefore to be assigned directly to the specimen 4. The most varied tests are possible in this case on the specimen 4.

The star test permits qualitative evaluation. For this purpose, a hole pattern with circular holes of 2 to 5 $\mu$m diameter is imaged as test object 5 through the specimen 4. The qualitative statements relate to the centering state of the specimen. This test method is customary in the field of microscopy. Individual image errors can likewise be analyzed by point-to-point imaging.

MTF measurements use the imaging of an edge. The MTF of the specimen can be calculated from the analyzed edge image up to a maximum local frequency dependent on magnification.

With the aid of the MTF measurement, it is possible to determine the "best focusing plane" of the specimen for which a specific local frequency is imaged with maximum contrast. For this purpose, the contrast characteristic is measured as a function of individual focus positions of the specimen 4.

The focal length of the specimen can be determined by measuring the magnification of a pattern distance known on the test object. The ratio of the known collimator focal length to magnification yields the focal length of the specimen.

The magnification in the image field can likewise be determined. Taking account of the angle of tilt, the distortion is yielded from the ratio of the magnification in the image center to that measured in the image field.

The specified tests are known per se.

The stand 1 is set up vertically in the exemplary embodiment represented. However, the entire structure can also be arranged horizontally.

What is claimed is:

1. A lens testing device comprising:

a holder, fitted on a stand, for mounting a lens specimen;

a test object illuminated from the rear;

an imaging objective and a detector for evaluating the image of the test object, the imaging objective being combined with the detector to form a unit, wherein the lens specimen comprises an objective specimen, the test object is arranged in the focal plane of the objective specimen inside the holder, the imaging objective comprises a collimator objective, the detector being arranged in the focal plane of the collimator objective, either the holder or the unit is pivotably supported on the stand, and the holder and the unit can be pivoted relative to one another.

2. The lens testing device as claimed in claim 1, wherein the test object is adjustably arranged inside the holder relative to the plane of the mount of the objective specimen.

3. The lens testing device as claimed in claim 1, wherein the mount of the objective specimen is rotatably supported on the holder.

4. The lens testing device as claimed in claim 1, wherein a CCD camera is provided as the detector.

5. The lens testing device as claimed in claim 4, wherein an electronic image evaluating device is connected downstream of the CCD camera.

6. The lens testing device as claimed in claim 1, wherein a focal length of the collimator objective is selected to be greater than that of the objective specimen.

* * * * *